Oct. 11, 1960  R. J. FRETER  2,955,516
WORK PIECE TRANSPORTING MECHANISM FOR BROACHING MACHINE
Original Filed Nov. 12, 1953  2 Sheets-Sheet 2

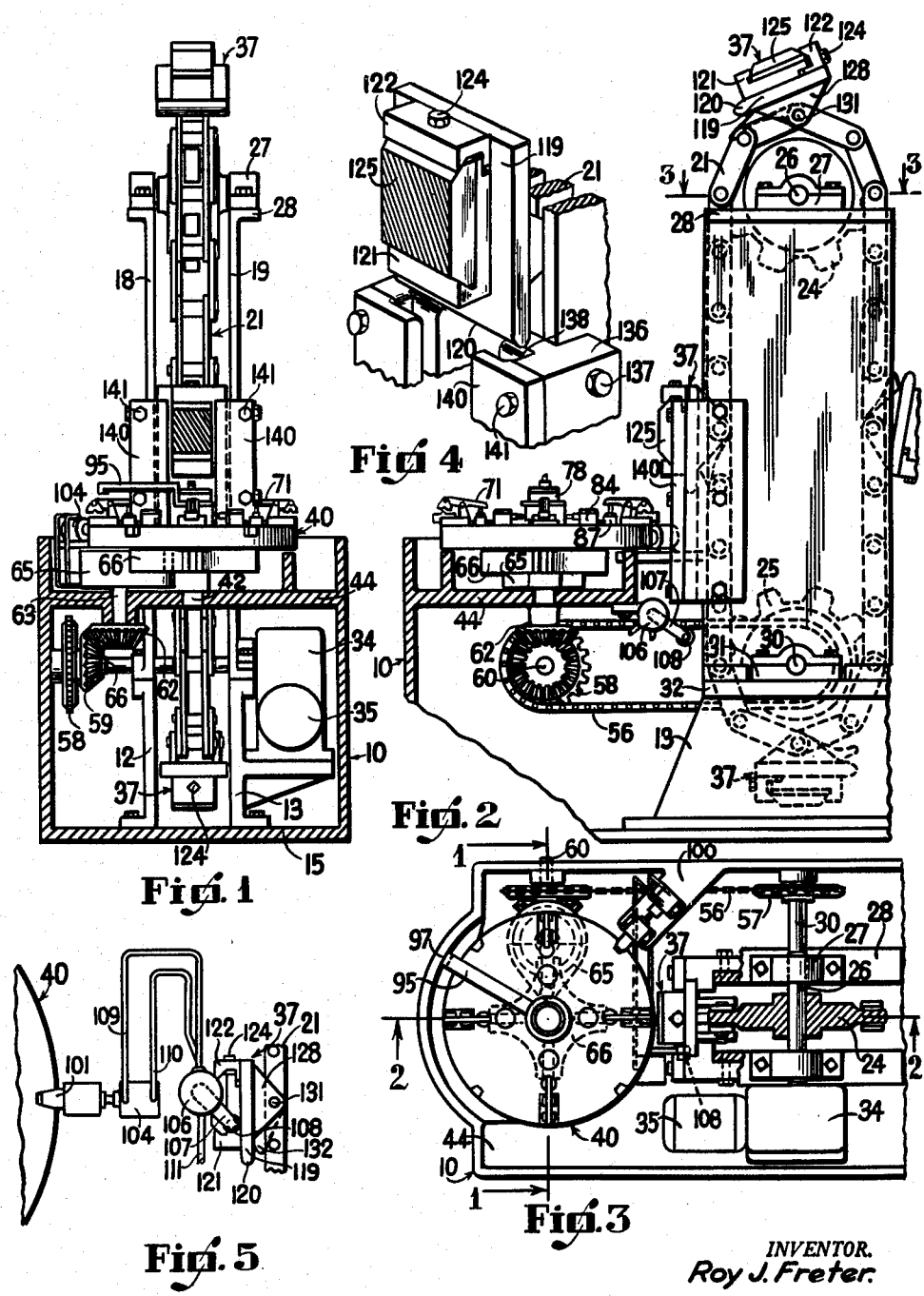

INVENTOR.
Roy J. Freter
BY Palmer Fultz
HIS
ATTORNEY

United States Patent Office 2,955,516
Patented Oct. 11, 1960

2,955,516

WORK PIECE TRANSPORTING MECHANISM FOR BROACHING MACHINE

Roy J. Freter, 250 W. Riverglen Drive, Worthington, Ohio

Continuation of abandoned application Ser. No. 587,296, May 25, 1956, which is a division of application Ser. No. 391,516, Nov. 12, 1953, now Patent No. 2,751,823, dated June 26, 1956. This application May 21, 1958, Ser. No. 736,926

3 Claims. (Cl. 90—56)

The present invention relates generally to metal working machines and more particularly to a novel work piece transporting mechanism for a continuous broaching machine for broaching work pieces at a high rate of production.

This application is a continuation of my copending application, Serial Number 587,296, filed May 25, 1956, now abandoned, which application is a division of my application Serial Number 391,516, filed November 12, 1953, now Patent Number 2,751,823, dated June 26, 1956.

The present novel work piece transporting mechanism is incorporated in a continuous broaching machine disclosed in the above mentioned patent which broaching machine incorporates a novel basic concept of surface broaching work pieces, with far greater speed than could heretofore be attained by prior production broaching constructions.

An aspect of the present invention consists of providing novel work piece transporting mechanism for a broaching machine which cyclically moves a broaching means along a cutting path, said mechanism serving to efficiently move and position work pieces relative to the cutting path in synchronization with said cyclical movement.

Another aspect of the present invention resides in providing a work piece transporting mechanism, in a machine of the type described, which mechanism is intermittently stationary to permit the operator to properly and safely load the work pieces.

Another aspect of the invention relates to the economy with which the present work piece transporting mechanism can be retooled. This is of particular significance in small volume production runs where high retooling costs prohibit the use of conventional production broaching machines.

As each work holder requires a custom fixture for the particular work piece being run, the fixture cost, in tooling, is great. The present mechanism utilizes relatively few work piece holders which are rapidly transported for high speed production, yet intermittently arrested, at a loading station, to permit loading of work pieces. Hence high speed production is obtained with relatively few work piece holders, and hence relatively few custom fixtures need be made in retooling the present machine for a particular run. It will, therefore, be seen that the greatly reduced tooling cost, of the present machine, permits the application of production broaching to jobs which were heretofore assigned to slower operations such as milling and grinding.

Another aspect of the present invention resides in the provision of a work piece transporting mechanism which permits a broaching machine to be operated with precision at the high operational speeds achieved by the continuous broaching machine disclosed in the above mentioned patent. Conventional hydraulic machines of today are designed to surface broach steel of medium high carbon content (S.A.E. 1035) at a rate of cutter speed travel of only seventy feet per minute. This speed limitation is not governed by the operator's ability to keep up with the machine, but rather by the inherent design of such present day machines which are designed by the limitations of tradition which set forth maximum rates of cutter speed at seventy feet per minute. The present inventor has discovered that these traditional limitations are entirely in error. Exhaustive broach tests have proven that excellent broach life is obtained, employing broaches of regular high speed steel, at speeds of cutter travel in excess of two hundred and fifty feet per minute.

Another aspect of the invention consists of achieving precision tolerance control by accurately locating the work piece holders, relative to the cutting path, at the broaching station.

As further aspects of the present invention, the present novel work piece transporting mechanism consists of simple structure which can be readily serviced and repaired. A machine incorporating the mechanism can be readily retooled by set-up men as all fixtures are out in the open and hence accessible. Moreover, the present mechanism is compact, particularly from the standpoint of floor space occupied; hence savings in plant overhead are realized as a result of the savings in floor space which result when a broaching machine incorporating the mechanism of the invention is employed.

Further objects and advantages of the present invention will be apparent from the following description, reference being had to the accompanying drawings wherein a preferred form of embodiment of the invention is clearly shown.

In the drawings:

Figure 1 is a front elevational view, partially in section, of a broaching machine which incorporates the work piece transporting mechanism of the present invention, with the section being taken substantially along the line 1—1 of Figure 3;

Figure 2 is a side elevational view, partially in section, of the broaching machine and mechanism of Figure 1, with the section being taken substantially along the line 2—2 of Figure 3;

Figure 3 is a top elevational view, partially in section of the broaching machine and mechanism of the preceding figures, with the section being taken substantially along the line 3—3 of Figure 2;

Figure 4 is a partial perspective view showing a broach holder and a slide for guiding same, said holder and slide being utilized in connection with the machine and mechanism of the preceding figures;

Figure 5 is a schematic view of a means for accurately locking the work piece transporting mechanism of the present invention, at various positions of movement, just prior to each passage of the broaching means along the cutting path;

Figure 6:
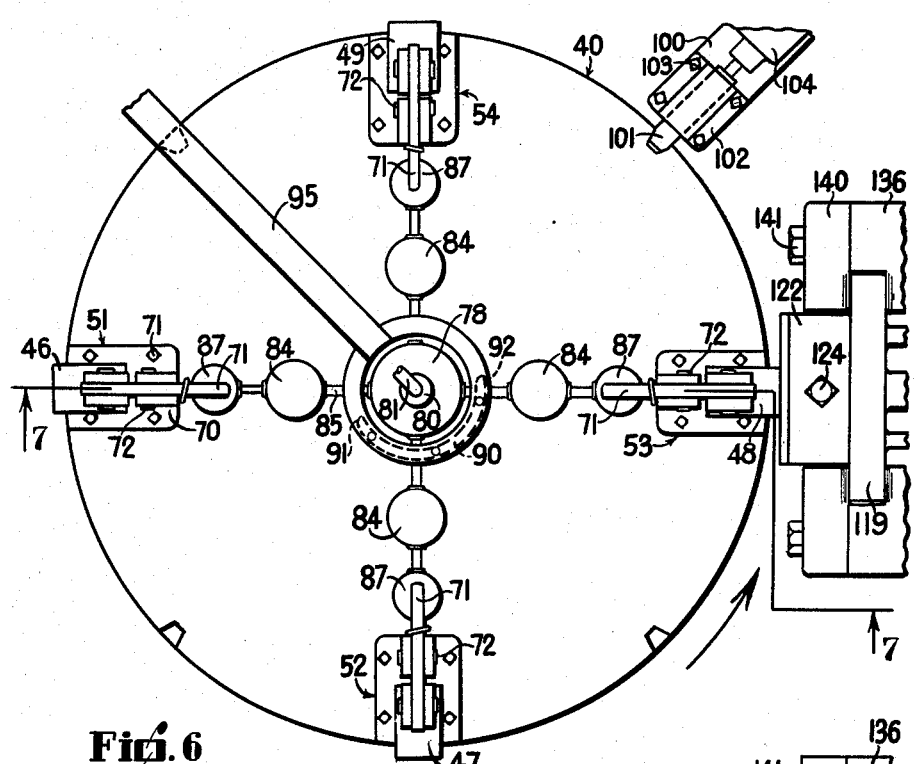
Figure 6 is a top elevational view of the work piece transporting mechanism and broach slide of the present invention showing fixtures for holding work pieces and associated apparatus for opening and closing the fixtures at various positions of movement of the mechanism.

Referring next to the drawing, and particularly to Figures 1, 2, and 3 which show a broaching machine and work piece transporting mechanism in corresponding elevational views, a main frame is indicated generally at 10. The frame 10 carries a pair of spaced supports 12 and 13 secured to a bottom plate 15.

A pair of vertically extending spaced side plates 18 and 19 are based on the spaced supports 12 and 13, respectively, with the side plates 18 and 19 forming a mounting means for a broach transporting apparatus. The broach transporting apparatus may be formed as an endless carrier, or chain 21, carried by an upper sprocket 24 and a lower sprocket 25. Upper sprocket 24 is keyed to a shaft 26 journaled in bearing blocks 27 which are mounted on flanges 28 provided on the side plates 18 and 19. Lower sprocket 25, which drives the chain 21, is keyed to shaft 30 journaled in bearing blocks 31 which are mounted on flanges 32 provided on the supports 12 and 13.

As is best seen in Figures 1 and 3, an end of shaft 30 is engaged and driven by a variable speed drive 34 which includes a prime mover 35. As the present invention contemplates the cyclical movement of a broaching means along a predetermined path, to be referred to herein as the cutting path, a broaching means is provided for the present structure in the form of broach carriage assemblies, indicated generally at 37. As such broach carriage assemblies are mounted at spaced intervals along endless carrier 21, it will be seen that a broaching means is cyclically transported along the cutting path, which path represents a portion of the entire path of broaching means travel. Moreover, it is seen that the rate of speed at which the broaching means travels along the cutting path, and the cyclical rate at which the broaching means traverses the cutting path, can be readily varied by changing the setting of the variable speed drive 34.

The broaching machine, described above, incorporates a novel work piece transporting means constructed according to the present invention and adapted for sequentially transporting work pieces into the above defined cutting path. Such work piece transporting means may be formed as a turntable, indicated generally at 40 in the figures, mounted for rotation about a vertical axis by means of a shaft 42 journaled in top plate 44 of frame 10.

Turntable 40 is sequentially rotated through a predetermined angle of rotation, and stopped at predetermined positions such that work pieces 46, 47, 48, and 49, best seen in Figure 6, are sequentially moved into and out of the cutting path of the broaching means. The work pieces 46, 47, 48, and 49 are carried on turntable 40 by a plurality of clamping means indicated generally at 51, 52, 53, and 54 respectively. Such clamping means, and the associated apparatus for actuating same, are described elsewhere, herein, in detail.

For the purpose of sequentially rotating and stopping turntable 40 to sequentially index successive work pieces with the path of the broaching means, a chain 56 is driven by a gear 57 which is keyed to the lower sprocket shaft 30 as is best seen in Figure 3. Chain 56 drives a gear 58 and a beveled gear 59 coaxially mounted on jackshaft 60 which shaft is journaled in the frame 10. The beveled gear 59 in turn drives a beveled gear 62 which is keyed to a vertically extending shaft 63 journaled in frame top plate 44. A driving portion 65, of a Geneva drive mechanism, is keyed to the upper end of shaft 63, with the driving portion 65 being in operational engagement with a driven portion 66 of the Geneva drive, said driven portion being keyed to the vertically extending shaft 42, which shaft rotatably mounts turntable 40 on the frame top plate 44 as previously described.

From the preceding description it will be seen that the work piece transporting means, or turntable 40, is driven by the same variable speed drive 34 and prime mover 35 which operates the broach transporting means since power for rotating turntable 40 is taken off of lower sprocket shaft 30. Hence, with the gear train described, the speed of rotation of the work piece transporting means, or turntable 40, will always be proportioned to the speed of travel of the broach transporting means for any given speed at which the variable speed drive 34 is operated. An important difference exists, however, in that the motion of the broach transporting means is continuous, due to the direct chain and sprocket drive, whereas the motion of the work piece transporting means, or turntable 40, consists of intermittent rotary motion periods and stop positions due to the fact that the Geneva drive, portions 65 and 66, is provided in the drive mechanism for the work piece transporting means. Hence the turntable 40 remains stationary for intermittent periods. During each period a work piece can be inserted in the particular clamping means which is stationary at the loading station. For example, see clamping means 51 in Figure 6. At the same time another work piece is retained stationary in the path of the broaching means by clamping means 53, and still another work piece is either removed or objected from clamping means 54. After the above mentioned operations have occurred, a stationary period for the turntable 40 will automatically be terminated by the continuously operating Geneva drive and turntable 40 will be rotated so that each of the clamping means 51, 52, 53, and 54 will be transported to the next successive station of rotation and the operations above described will be performed on the work pieces newly presented at each station of rotation.

Figure 7:
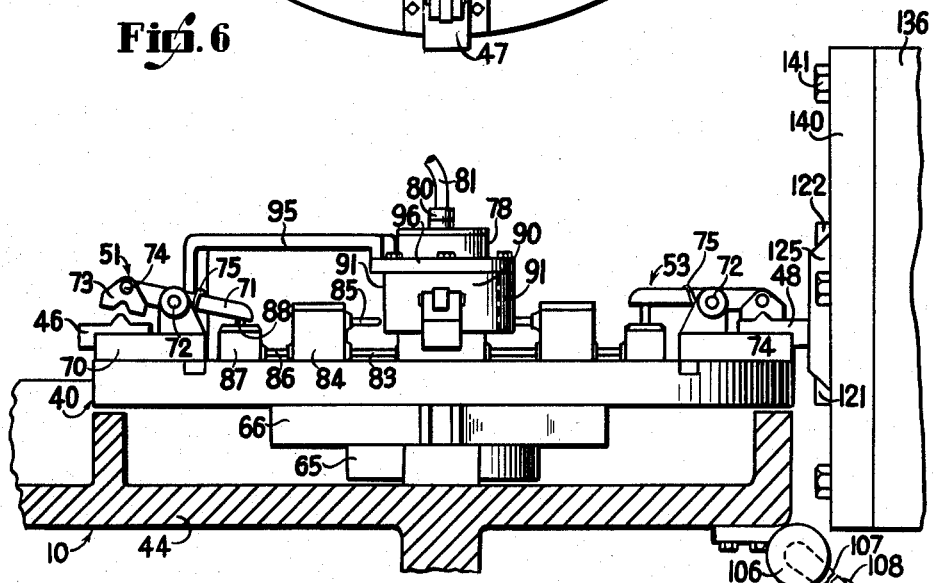
Figure 7 is a side elevational view corresponding to Figure 6 and taken partially in section along the line 7—7 of Figure 6.

Referring particularly to Figures 6 and 7 of the drawing, the clamping means 51, 52, 53, and 54, together with the associated apparatus for automatically actuating same, will next be described in detail. As previously mentioned, clamping means 51 is shown at the loading station and in open disposition. Such clamping means consists of a block 70 which is provided with a slot shaped to register with the particular shape of the work piece to be broached. Block 70 is removably secured to turntable 40 so that said block can be removed and changed or replaced when the machine is to be retooled for a production run of work pieces of a different shape. Block 70 carries clamping lever 71 pivoted at 72, said lever being provided with a clamp 73 pivoted thereto at 74. Clamp 73 may be shaped, in the tooling-up operation, so as to efficiently engage and position the work piece 46. A spring 75 may be provided for normally urging clamping lever 71 towards the open position shown at the loading station.

To close clamping means 51, upon rotation of turntable 40 and after a work piece has been inserted, a suitable control power means is employed which may be in the form of the compressed air system best seen in Figures 6 and 7. An air reservoir 78 is mounted in stationary disposition on the center of turntable 40. Since air reservoir 78 rotates with turntable 40, a rotary fitting 80 is utilized at the junction where air intake line 81 enters the reservoir 78. A plurality of air outlet lines 83 extend radially from the base of air reservoir 78 with each of said air outlet lines 83 extending to a respective cam operated air valve 84. Each of the air valves 84 includes a follower 85 extending towards the axis of rotation of turntable 40. Air valves 84 are each, in turn, connected by an air line 86 to a respective air cylinder 87 which cylinder includes a vertically extending plunger 88 in engagement with an end of a respective clamping lever 71 for actuating same to close the respective clamping means.

For the purpose of automatically and sequentially closing and opening the work piece clamping means 51, 52, 53, and 54 at the proper stations of rotation of the turntable 40, a stationary cam 90, including a T portion 91 and a heel portion 92, is disposed inwardly of the air valves 84 and outwardly spaced from the air reservoir 78 as best seen in Figures 6 and 7. To support the cam 90 in the stationary position above described, an arm 95, including a cam mounting ring 96, is secured to the frame 10 as seen in Figure 3 at 97.

Considering clamping means 51, which is shown in open disposition at the loading station, it will be seen that follower 85 is not, at such station, engaged and depressed by cam 90; hence the normally closed air valve 84 is closed so that the air supply cannot actuate air cylinder 87. Hence, clamping lever 71 is held in the open position by the spring 75. Upon rotation of turntable 40, however, follower 85 advances and engages toe 91 of cam 90. The follower 85 is thereby depressed opening air valve 84 which permits air to pass from reservoir 78 to air cylinder 87 whereby the clamping means 51 is immediately closed. Clamping means 51 will next be sequentially advanced to the 90 degree station of rotation, and then to the 180 degree station of rotation at which latter broaching of the work piece 46 occurs. It will be seen, from Figure 6, that follower 85 will remain in depressed engagement with cam 90 up to, and slightly beyond, the 180 degree or broaching station. As soon as clamping means 51 is advanced to a position slightly beyond the broaching station, follower 85 will leave cam 90 at heel portion 92. Air valve 84 will thereby be closed and air cylinder 87 ceases to apply force to clamping lever 71. Clamping lever 71 then returns to the open position due to the action of spring 75 and remains open through the balance of the cycle of rotation of the turntable. Hence it is seen that work pieces can be removed, or ejected, either at the 270 degree station of rotation or after the clamping means has rotated through 360 degrees and returned to the loading station. It is preferable, however, to automatically eject the work pieces at the 270 degrees station of rotation so that the operator of the machine need only be concerned with placing a work piece in each successive clamping means as it stops in open disposition at the loading station.

For the purpose of accurately positioning and locking the turntable 40 at each of the stationary positions of rotation in order to effect precision broaching for close tolerance control, a turntable locking mechanism is provided. Figure 5 is a schematic view of the various elements of such locking mechanism including a beveled latch 101 adapted to lockingly engage beveled slots in the periphery of the turntable 40 as is best seen in Figures 3 and 6. Beveled latch 101 is guided and secured to frame portion 100 by a guide member 102. A power cylinder 104 normally urges the beveled latch 101 against the periphery of turntable 40 such that beveled latch 101 will be caused to enter each beveled slot when the slot is advanced, by rotation of the turntable, to a position confronting the inwardly biased beveled latch 101.

To unlock the turntable, just prior to the ending of each stationary period and after broaching has been effected, a control valve 106 is mounted to the frame adjacent to the path of travel of the broaching means 37 as shown in Figures 2 and 7. Control valve 106 includes an arm 107 carrying a roller 108. Roller 108 extends into the path of and is cyclically engaged by the broaching means subsequent to each passage of the broaching means along the cutting path. Control valve 106 serves to control the flow of fluid, such as air, to a power cylinder 104 through lines 109 and 110. Hence upon actuation of arm 107, upon engagement of roller 108 by the broaching means, fluid passage through lines 109 and 110 energizes power cylinder 104 which serves to retract beveled latch 101. The turntable 40 is thereby unlocked subsequent to passage of the broaching means 37 through the cutting path and prior to advancement of the turntable 40 at the next station of rotation by the Geneva drive 65 and 66. It is therefore seen that whereas the Geneva drive serves to sequentially rotate and stop the turntable at the successive stations, the turntable locking mechanism provides refined positioning means for precision work piece location at the broaching station.

To further effect precision broaching and close tolerance control, means is provided for accurately guiding the broaching means 37 during its passage along the cutting path at which time engagement with the work piece occurs. Slide members 136 are secured to vertical side plates 18 and 19 by machine screws 137. Caps 140 are secured to slide members 136 and cooperate therewith to form guide slots 138. The entrance to guide slots 138 is beveled, as best seen in Figure 4, to effect entry therein of broaching means 37 which includes a carriage 119 formed with a rounded nose 120. Carriage 119 is conveyed by chain 21, which chain is efficient for its purpose, but not structurally adapted for effecting a precisely located cutting path for the broaching means 37. A precise sliding fit, together with proper lubrication, is therefore provided between carriage 119 and guide slots 138. Due to the inherent flexibility of chain 21 the carriage 119 will not always be precisely presented to guide slots 138. Hence the entrance to the slots is beveled, as shown in Figure 4, to effect entry of broaching means 37 into the precisely located cutting path defined by guide slots 138.

From the foregoing it will be understood that precision broaching is achieved by accurate location of the work pieces by means of the turntable locking mechanism, and by accurately locating and controlling the cutting path of the broaching means.

With particular reference to the broaching means 37, it will be seen, from Figures 2 and 5, that carriage 119 is pivotally mounted to chain 21 by pin 131 passing through flanges 128, which flanges straddle the chain 21 in the manner shown in Figure 3. Carriage 119 is also formed with a third central flange 132 which extends forwardly from carriage 119 to engage the preceding chain pin. The broaching means is traveling downwardly towards the guide slots 138 as seen in Figure 5. In such position of broaching means travel the flange 132 serves to properly position the nose 120, of the pivotally mounted carriage 119, for entry into guide slots 138.

For the purpose of removably securing a broach cutter 125 to the carriage 119, a slideably carried wedge block 122 is secured to stationary guide block 121 by means of threaded fastening 124. Accurate positioning of broach cutter 125 can be effected by keying same to the wedge blocks. Hence it is seen that broach cutter 125 can be readily removed for retooling or replaced when worn.

In summary, from the foregoing description it will be understood that the present invention provides, a novel work piece transporting mechanism for effecting continuous broaching of multiple parts whereby such parts are broached at a faster rate and with more precise tolerance control than has heretofore been obtainable by conventional constructions.

While the form of embodiment of the present invention as herein disclosed constitutes a preferred form, it is to be understood that other forms might be adopted, all coming within the scope of the claims which follow.

I claim:

1. An improved work piece transporting mechanism comprising a frame; a circular platform rotatable about a central axis; means for intermittently moving and stopping said platform; a plurality of workpiece clamping means mounted in spaced relationship on the periphery of said platform and movable between open and closed positions; means forming a source of pressurized fluid including a reservoir centrally of said platform; a stationary cam mounted to said frame and disposed centrally of said platform; a plurality of fluid actuated cylinders mounted on said table inwardly of said clamping means for moving each of said clamping means towards one of said positions; a plurality of radially extending conduit means each of which connects a respective one of said cylinders with said reservoir; a plurality of valve means, each of said valve means serving to control the flow of fluid in a respective one of said conduit means; and a plurality of actuators for said valve means, each of said actuators including a radially inwardly extending follower engageable with said cam.

2. An improved work piece transporting mechanism comprising a frame; a circular platform rotatable about a central axis; means for intermittently moving and stopping said platform; a plurality of workpiece clamping means mounted in spaced relationship on the periphery of said platform and movable between open and closed positions, each of said clamping means comprising a pivoted lever including an end for receiving a fixture for engaging a work piece; means forming a source of pressurized fluid including a reservoir centrally of said platform; a stationary cam mounted to said frame and disposed centrally of said platform; a plurality of fluid actuated cylinders mounted on said table inwardly of said clamping means for moving each of said clamping means towards one of said positions, means of said cylinders including a plunger engaging a respective one of said levers; a plurality of radially extending conduit means each of which connects a respective one of said cylinders with said reservoir; a plurality of valve means, each of said valve means serving to control the flow of fluid in a respective one of said conduit means; and a plurality of actuators for said valve means, each of said actuators including a radially inwardly extending follower engageable with said cam.

3. An improved work piece transporting mechanism comprising a frame; a circular platform rotatable about a central axis; means for intermittently moving and stopping said platform, said platform including a peripheral surface provided with a plurality of circumferentially spaced slots; a plurality of workpiece clamping means mounted in spaced relationship on the periphery of said platform and movable between open and closed positions; means forming a source of pressurized fluid including a reservoir centrally of said platform; a stationary cam mounted to said frame and disposed centrally of said platform; a plurality of fluid actuated cylinders mounted on said table inwardly of said clamping means for moving each of said clamping means towards one of said positions; a plurality of radially extending conduit means each of which connects a respective one of said cylinders with said reservoir; a plurality of valve means, each of said valve means serving to control the flow of fluid in a respective one of said conduit means; a plurality of actuators for said valve means, each of said actuators including a radially inwardly extending follower engageable with said cam; a bolt mounted to said frame and engaging said peripheral surface; means biasing said bolt inwardly against said surface and to cause said bolt to enter said slots; and means for withdrawing said bolt from said slots.

References Cited in the file of this patent

UNITED STATES PATENTS

| | | |
|---|---|---|
| 1,628,103 | Best | May 10, 1927 |
| 1,810,300 | Spring | June 16, 1931 |
| 2,122,356 | Bullard | June 28, 1938 |